US007330364B2

(12) United States Patent
Lynch

(10) Patent No.: US 7,330,364 B2
(45) Date of Patent: Feb. 12, 2008

(54) DEVICE FOR CONVERTING HIGH VOLTAGE ALTERNATING CURRENT (AC) TO LOW VOLTAGE DIRECT CURRENT (DC) AND METHOD THEREFOR

(75) Inventor: Scott Lynch, Half Moon Bay, CA (US)

(73) Assignee: Supertex, Inc., Sunnyvale, CA (US)

( * ) Notice: Subject to any disclaimer, the term of this patent is extended or adjusted under 35 U.S.C. 154(b) by 323 days.

(21) Appl. No.: 10/969,665

(22) Filed: Oct. 20, 2004

(65) Prior Publication Data

US 2006/0083038 A1 Apr. 20, 2006

(51) Int. Cl.
*H02M 5/42* (2006.01)
*H02M 7/00* (2006.01)
*G05F 1/40* (2006.01)

(52) U.S. Cl. ........................................ 363/84; 363/125

(58) Field of Classification Search ................ 323/268, 323/271, 273–277, 282, 284, 285, 288; 363/84, 363/89, 125–127
See application file for complete search history.

(56) References Cited

U.S. PATENT DOCUMENTS 4,947,311 A * 8/1990 Peterson ..................... 363/124
5,530,878 A * 6/1996 Bauer et al. ................ 713/310
6,713,974 B2 * 3/2004 Patchornik et al. ......... 315/295
7,026,847 B2 * 4/2006 Wang et al. ................ 327/112

* cited by examiner

*Primary Examiner*—Matthew V. Nguyen
(74) *Attorney, Agent, or Firm*—Jeffrey D. Moy; Weiss & Moy, P.C.

(57) ABSTRACT

A method and circuit for converting high voltage AC to low voltage DC using a switched power supply and rising edge conduction has an alternating current (AC) power source. A rectifier is coupled to the AC power source. A switching device is coupled to the rectifier. The switching device is opened and closed only during rising edge conduction. Control circuitry is coupled to the switching device for opening and closing of the switching device only during rising edge conduction. A storage capacitive element is coupled to the switching device.

17 Claims, 5 Drawing Sheets

DEVICE FOR CONVERTING HIGH VOLTAGE ALTERNATING CURRENT (AC) TO LOW VOLTAGE DIRECT CURRENT (DC) AND METHOD THEREFOR

BACKGROUND OF THE INVENTION

1. Field of the Invention

This invention relates to generally to the conversion of high voltage alternating current (AC) to low voltage direct current (DC) and, more specifically, to an apparatus and a method for converting high voltage AC to low voltage DC without the use of transformers, large capacitive coupling circuits or high voltage linear regulators and with improved efficiency.

2. Description of the Prior Art

There are devices such as consumer appliances and electronics, i.e. refrigerators, washing machines, dishwashers, microwave ovens, etc., which require high voltage AC power and low voltage DC power. The low voltage DC requirement is for powering analog and digital control circuitry, display indicators such as Light Emitting Diodes and other low power devices.

The prior art identifies attempts to provide AC to DC conversion in three principal categories: the transformer approach, the high voltage linear regulator approach and the high voltage capacitive coupling approach. Each of these three approaches has limitations which are discussed below.

Referring to FIG. 1, the transformer approach with full wave rectifier is illustrated. The step down transformer will drop the input voltage, which is typically 110-120 VAC for devices operating in the U.S. and Canada and typically 220-240 VAC for devices operating in Europe and elsewhere in the world, to a low voltage in the range of 5-24 VAC, depending on the application. After step down, the sinusoidal AC input is then rectified by a full wave rectifier, i.e. diodes D1, D2, D3 and D4. The capacitors C1 and C2 combine with the linear regulator to provide a stable DC output voltage $V_{OUT}$.

The disadvantage to this approach, and to all transformer approaches, is the prohibitive cost, size, weight and power consumption of step down transforms. Furthermore, the approach of FIG. 1 also requires a four diode bridge rectifier.

Referring to FIG. 2, a step down transformer is used in conjunction with a half wave rectifier. The transformer provides a low voltage AC component as in FIG. 1. However, in the case of FIG. 2, a single diode D1 is used to form the half wave rectifier. The capacitors C1 and C2 with the linear regulator provide a stable DC output voltage. Although this approach uses only one diode, as compared to four diodes in FIG. 1, the capacitor C1 must be significantly larger than its counterpart in the full wave rectifier configuration to compensate for the half wave rectification. Thus, the disadvantage to this approach, in addition to the step down transformer, is the size of the capacitor C1.

Referring to FIG. 3, another configuration of the transformer approach is illustrated using a center tap transformer and a full wave rectifier comprised of diodes D1 and D2. The center tapped transformer, while permitting a two diode full wave rectifier, adds complexity and therefore cost to the configuration.

Referring to FIG. 4, the high voltage linear regulator approach is illustrated. In this approach, the bulky and costly step down transformer is eliminated from the circuit. The high voltage AC input is rectified by the full wave rectifier, diodes D1, D2, D3 and D4 and stored by capacitor C1. The high voltage linear regulator reduces the high DC voltage to a low DC output voltage, typically in a range of 5-24 VDC. Capacitor C2 provides a filter for the DC output voltage. The disadvantage of the high voltage linear regulator approach is excessive power dissipation caused by the storage of high voltages on capacitor C1.

Referring to FIG. 5, the high voltage capacitive coupling approach is illustrated. Once again the step down transformer is eliminated. Capacitor C1 couples the AC component to the full wave rectifier, i.e. diodes D1, D2, D3 and D4, across resistor R1. The zener diode Z1 limits the output of the full wave rectifier to the desired low voltage DC output. Capacitor C2 provides a filter for the DC output voltage. Although this approach reduces the power consumption over the approach shown in FIG. 4, the size of capacitor C1 is prohibitively large. Furthermore, it also suffers from high no-load power consumption.

Therefore, a need existed to provide an improved apparatus and method for converting high voltage AC to low voltage DC. The improved apparatus and method for converting high voltage AC to low voltage DC must overcome the problems associated with prior art devices and methods. The improved apparatus and method must convert high voltage AC to low voltage DC without the use of transformers, large capacitive coupling circuits or high voltage linear regulators and with improved efficiency.

SUMMARY OF THE INVENTION

In accordance with one embodiment of the present invention, it is an object of the present invention to provide an improved apparatus and a method for converting high voltage AC to low voltage DC.

It is another object of the present invention to provide an improved apparatus and a method for converting high voltage AC to low voltage DC that overcomes the problems associated with prior art devices and methods.

It is another object of the present invention to provide an improved apparatus and method that converts high voltage AC to low voltage DC without the use of transformers, large capacitive coupling circuits or high voltage linear regulators and with improved efficiency.

BRIEF DESCRIPTION OF THE EMBODIMENTS

In accordance with one embodiment of the present a method for converting high voltage AC to low voltage DC using a switched power supply is disclosed. The method comprises: closing a switch of the switched power supply only during rising edge conduction; and opening the switch of the switched power supply only during rising edge conduction.

In accordance with another embodiment of the present a method for converting high voltage AC to low voltage DC using a switched power supply is disclosed. The method comprising: suppression of falling edge conduction; and opening and closing a switch of the switched power supply only during rising edge conduction.

In accordance with another embodiment of the present a circuit for converting high voltage AC to low voltage DC using a switched power supply and rising edge conduction is disclosed. The circuit has an alternating current (AC) power source. A rectifier is coupled to the AC power source. A switching device is coupled to the rectifier. The switching device is opened and closed only during rising edge conduction. Control circuitry is coupled to the switching device for opening and closing of the switching device only during rising edge conduction. A storage capacitive element is coupled to the switching device.

The foregoing and other objects, features, and advantages of the invention will be apparent from the following, more particular, description of the preferred embodiments of the invention, as illustrated in the accompanying drawing.

BRIEF DESCRIPTION OF THE DRAWINGS

The novel features believed characteristic of the invention are set forth in the appended claims. The invention itself, as well as a preferred mode of use, and advantages thereof, will best be understood by reference to the following detailed description of illustrated embodiments when read in conjunction with the accompanying drawings.

DETAILED DESCRIPTION OF THE PREFERRED EMBODIMENT

The present invention discloses an apparatus and a method for converting high voltage AC to low voltage DC without the use of transformers, large capacitive coupling circuits or high voltage linear regulators. The methodology relates to rising edge only conduction which has the benefit of having improved charging efficiency and reduced electromagnetic interference (EMI).

Figure 1:
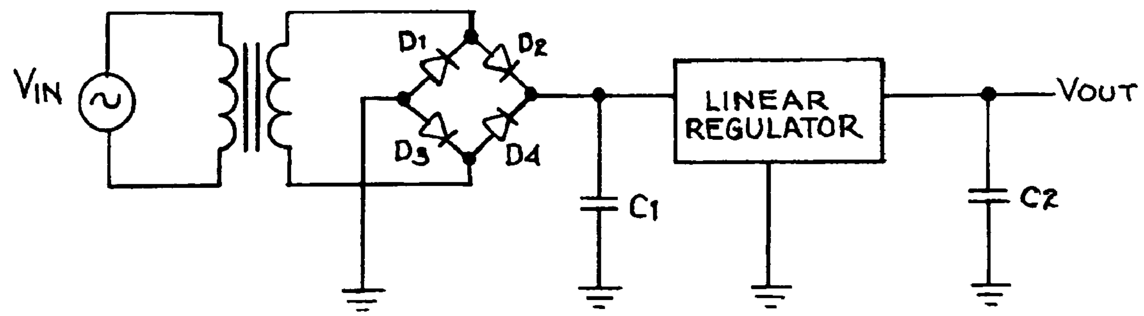
FIG. 1 is a schematic diagram illustrating the prior art step down transformer approach with a full wave rectifier.
Figure 2:
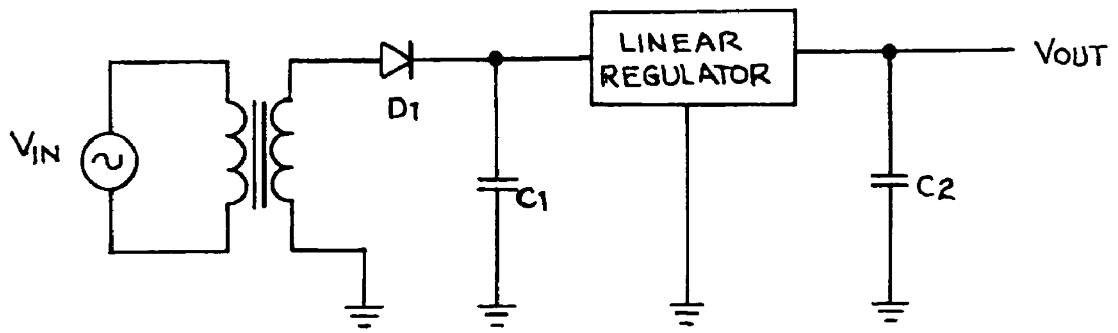
FIG. 2 is a schematic diagram which illustrates the prior art step down transformer approach with a half wave rectifier.
Figure 3:
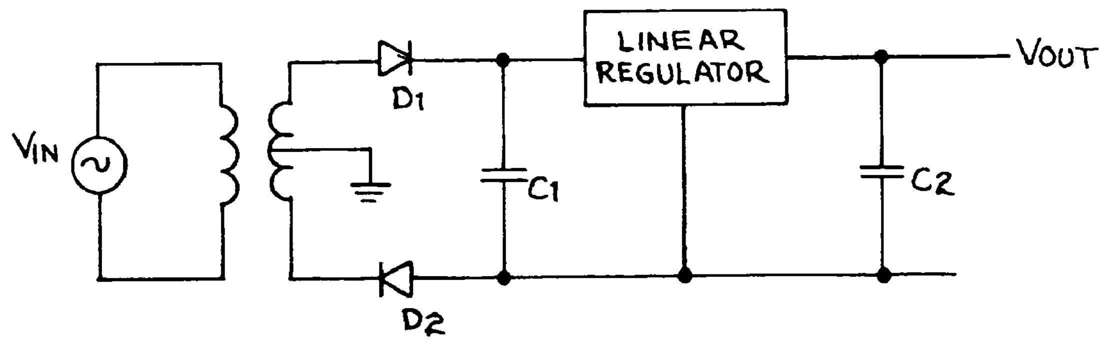
FIG. 3 is a schematic diagram illustrating the prior art step down center tapped transformer approach with a full wave rectifier.
Figure 4:
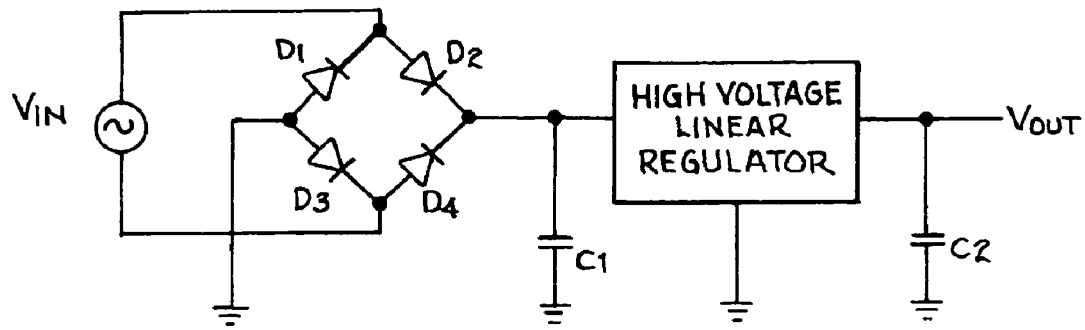
FIG. 4 is a schematic diagram of the prior art high voltage linear regulator approach with a full wave rectifier.
Figure 5:
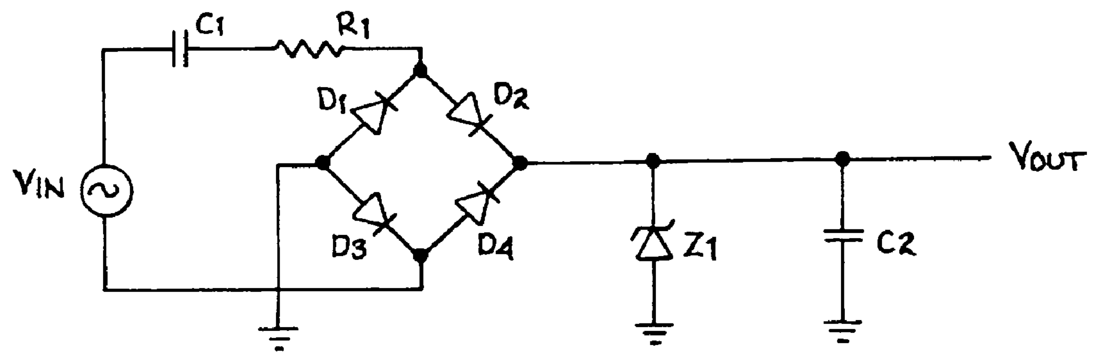
FIG. 5 is a schematic diagram of the prior art high voltage capacitive coupling approach with a full wave rectifier.
Figure 6:
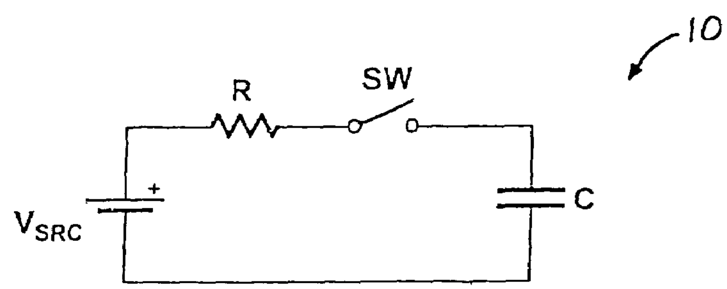
FIG. 6 is a schematic diagram of a prior art circuit for charging a capacitor with a DC power source.

The concept of rising edge only conduction will be explained by referring to FIG. 6 where a simplified charging capacitor circuit 10 is shown. The circuit 10 has a power supply $V_{SRC}$. In FIG. 6, the power supply $V_{SRC}$ is a DC power supply. A resistive element R is coupled in series with the DC power supply $V_{SRC}$. A switch SW is coupled in series with the resistive element R. A capacitive element C is coupled in series to the switch SW and the DC power supply $V_{SRC}$. The maximum charging efficiency that may be achieved by the circuit 10 is defined by the equation:

$$\eta = \frac{1}{2}(1 + V_{ci}/V_{SRC})$$

where $\eta$ is the charging efficiency $V_{SRC}$ is the source voltage $V_{ci}$ is the initial voltage on C before SW is closed As can be seen from the equation, the charging efficiency of the circuit 10 is independent of the resistive element R. Thus, no matter how low the resistance of the resistive element R, the charging efficiency of the circuit 10 will not improve.

Figure 7:
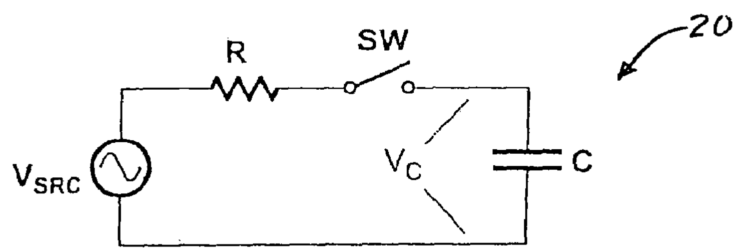
FIG. 7 is a schematic diagram of a prior art circuit for charging a capacitor with an AC power source.

Now, referring to FIG. 7, a charging capacitor circuit 20 is shown. The circuit 20 is the same as the circuit 10 discussed above. The only difference is that the power supply $V_{SRC}$ is now an AC power supply. The capacitor C will start out with an initial voltage $V_{ci}$. The switch SW is closed on the rising edge of the voltage $V_{SRC}$ at the instant $V_{SRC}=V_{ci}$, and is opened when the capacitor voltage rises to some value $V_{cx}$. In this case, efficiency improves as the resistance is decreased. The circuit 20 is in theory 100% efficient when the resistance is zero. Thus a sine switched circuit 20 has the potential to be more efficient than the DC switched circuit 10.

Figure 8:
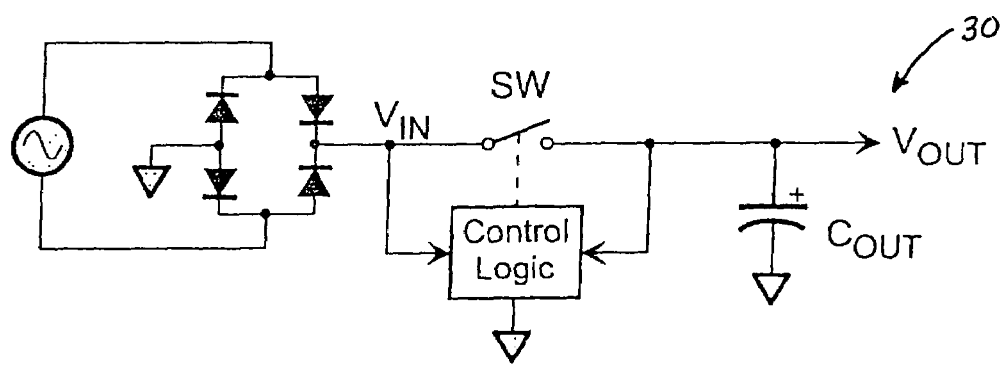
FIG. 8 is a simplified functional block diagram of the present invention.
Figure 9:
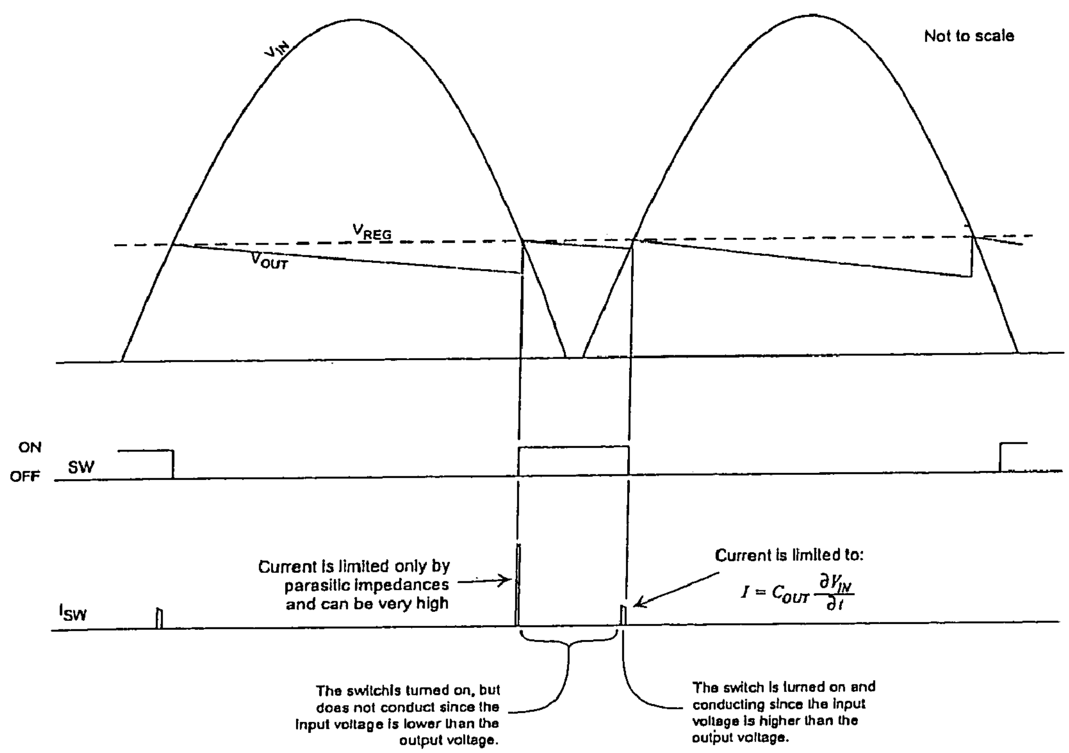
FIG. 9 is a graph showing prior art conduction on both raising and falling edges.

Referring now to FIGS. 8-9, operation of a circuit for converting high voltage AC to low voltage DC 30 (hereinafter circuit 30) is described using a conventional switching method. The switch SW is generally close when the rectified input voltage $V_{IN}$ falls below the regulation point $V_{REG}$, recharging the storage capacitor $C_{OUT}$. The switch SW is turned off when the output voltage $V_{OUT}$ rises to the regulation point $V_{REG}$. The output capacitor C provides current to the load when the switch SW is off. During conduction on the falling edge a voltage step is instantaneously impressed across the output capacitor C. This method in operation is identical to the DC switched circuit with it's inherent inefficiencies.

Figure 10:
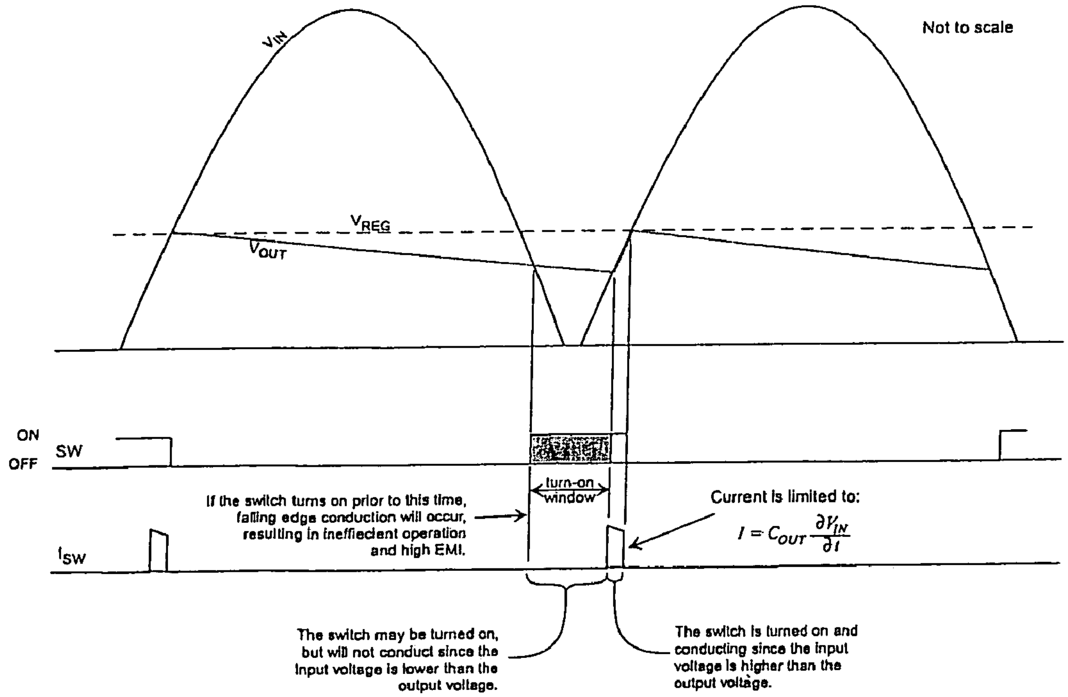
FIG. 10 is a graph showing the method of the present invention with conduction on raising edges only.

Referring now to FIGS. 8 and 10, a new switching methodology will be described. The switch SW is closed when the rectified AC is less than the output voltage $V_{OUT}$ and is opened when $V_{OUT}$ reaches the regulation voltage $V_{REG}$. The rising edge conduction is identical to the sine switched circuit and has the promise of being thus more efficient.

A further advantage of using the rising edge only conduction method is reduced EMI. Current during rising edge conduction is controlled, while the current during falling edge conduction is limited only by parasitic impedances and can be very high. These high peak currents, occurring in a short pulse, creates a lot of harmonics which results in high conducted emissions. Rising edge only conduction eliminates this particular source of conducted EMI, and may further reduce radiated EMI as well.

Suppression of falling edge conduction can be achieved by sensing when the input voltage falls below the output voltage and turning on the switch only then. Alternatively, the circuit may sense when the input voltage is a few volts above the output and turning on the pass element after a sufficient delay to allow the input voltage to fall below the output voltage. A third method could be sensing the rate of change of the rectified AC voltage and turning on the switch when it changes from negative to positive. A fourth method could be sensing when the input voltage falls below a preset value (selected to be below the lowest anticipated output voltage) and then turning on the switch. With all of the above methodologies discussed above, the switch is turned off when the output voltage reaches the regulation point.

Figure 11:
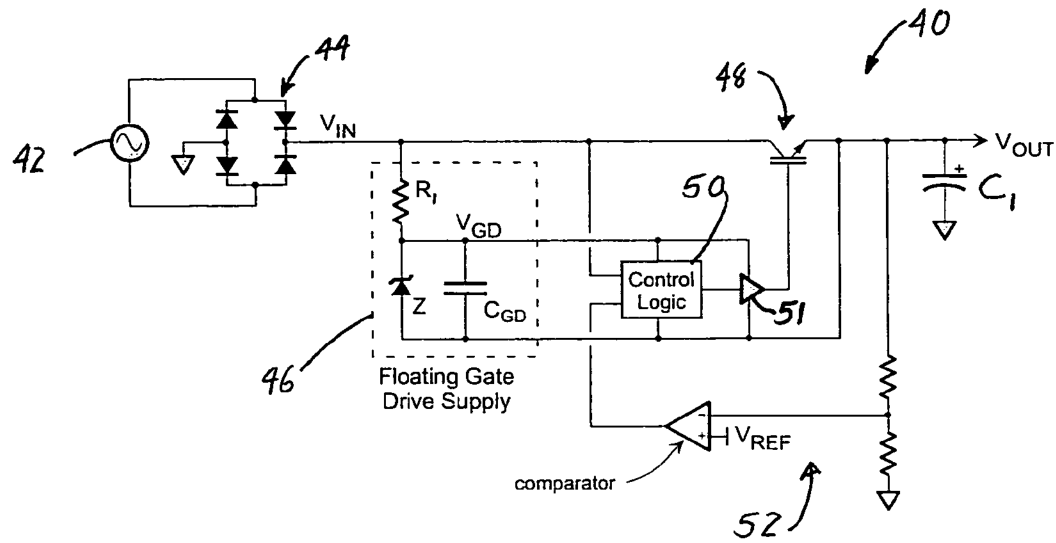
FIG. 11 is a more detailed functional block diagram of the present invention.
Figure 12:
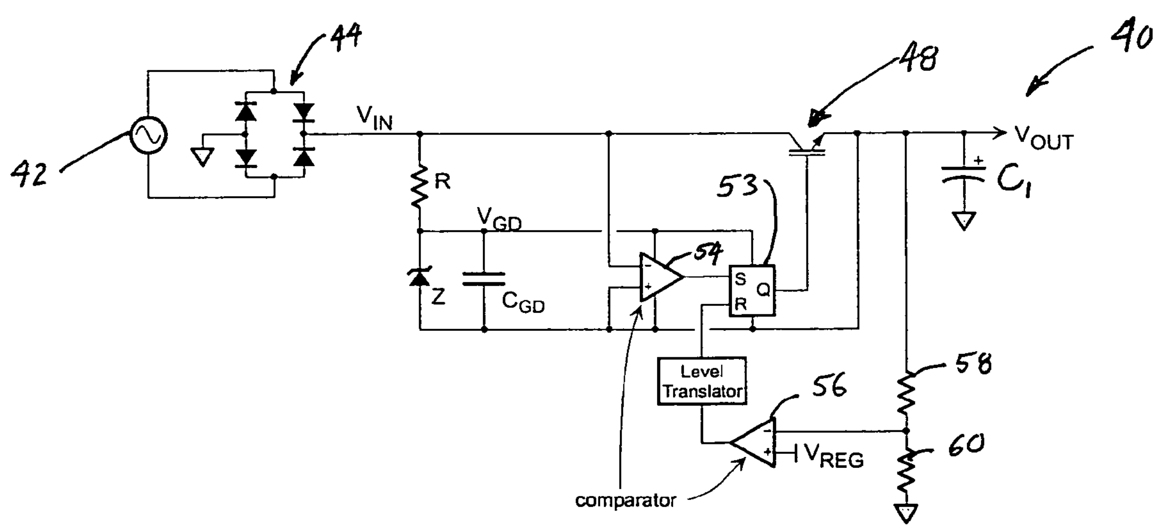
FIG. 12 is an electrical schematic of the present invention.

Referring to FIG. 11-12, one embodiment of a circuit for converting high voltage AC to low voltage DC using the rising edge only conduction 40 (hereinafter circuit 40) is shown in a block/schematic diagram. The circuit 40 has an AC power supply 42 having an input voltage $V_{IN}$. The AC power supply 42 is a sinusoidal AC voltage typically in the range of 50-60 Hz and either 110-120 VAC or 220-240 VAC.

A rectifier 44 is coupled to the AC power supply 42. The rectifier 44 is used for converting the AC input voltage $V_{IN}$ to a DC voltage. In the embodiment shown in FIG. 11, a full wave rectifier 44 is show. However, a half wave rectifier may also be used.

A floating gate drive supply 46 is coupled to the rectifier 44. The floating gate drive supply 46 is used supply power for control logic 50 and driver 51. Driver 51, in turn, is used to drive a switching device 48 which is coupled to the positive supply and is not ground-referenced but is floating. In general, the switching device 48 is a transistor device. If the switching device 48 is implemented using an N-channel MOSFET or IGBT, a voltage from the AC power supply 42 higher than the output voltage $V_{OUT}$ will be needed to drive the gate terminal of the MOSFET or IGBT. In addition to providing power for driving the gate of the switching device 48, the floating gate drive supply 46 may also be used to power any control circuitry floating on the output voltage $V_{OUT}$.

The gate driver 46 is a zener shunt regulator riding on top of the output voltage $V_{OUT}$. The floating gate drive supply 46 has a resistor $R_1$ having a first terminal coupled to the rectifier 44. A second terminal of the resistor $R_1$ is coupled to a first terminal of a zener diode Z and a first terminal of a capacitor $C_{GD}$. A second terminal of both the zener diode Z and the capacitor $C_{GD}$ are coupled to control circuit 50. The capacitor $C_{GD}$ supplies a load current during the intervals when $V_{IN}$ falls below $V_{GD}$. An optional blocking diode coupled in series with the resistor $R_1$ prevents reverse current flow when $V_{IN}$ is less than $V_{GD}$. The main advantage of using a shunt regulator in the circuit 40 is that the resistor $R_1$ is the only high voltage component, which makes fabrication on an integrated circuit fairly easy.

The switching device 48 is also coupled to a capacitive element $C_1$. The capacitive element $C_1$ is a storage capacitor which is charged when the switching device 48 is closed. A control circuit 50 is coupled to the rectifier 44, the floating gate drive supply 46, and the switching device 48. The control circuit 50 is used to control the opening and closing of the switching device 48. The control circuit 50 will close the switching device 48 when the rectified AC is less than the output voltage $V_{OUT}$ and open the switching device 48 when $V_{OUT}$ reaches the regulation voltage $V_{REG}$.

The control circuit 50 is coupled to a voltage monitoring circuit 52. The voltage monitoring circuit 50 will monitor the output voltage of the circuit 40. When the rectified AC voltage is less than the output voltage $V_{OUT}$, the voltage monitoring circuit 50 will send a signal to close the switching device 48. The voltage monitoring circuit 52 will send a signal to open the switching device 48 when $V_{OUT}$ reaches the regulation voltage $V_{REG}$.

As seen more clearly in FIG. 12, the control circuit 50 is comprised of a flip flop device 53. The set terminal S of the flip flop 53 is coupled to an output of a comparator 54. The comparator 54 having inputs coupled to the voltage nodes $V_{IN}$ and $V_{OUT}$. The reset terminal R is coupled to a level translator which is further coupled to an output of another comparator 56. The comparator 56 has inputs coupled to a voltage divider circuit defined by resistors 58 and 60 and a set voltage $V_{REG}$.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A method for converting high voltage AC to low voltage DC using a switched power supply comprising:
suppression of falling edge conduction;
closing a switch of the switched power supply to cause conduction only on rising edge when a rectified AC voltage is less then an output voltage; and
opening the switch when the output voltage is approximately equal to a regulation voltage.

2. A method for converting high voltage AC to low voltage DC using a switched power supply comprising:
suppression of falling edge conduction; and
opening and closing a switch of the switched power supply only during rising edge conduction, wherein the switch is opened when an output voltage is approximately equal to a regulation voltage and the switch is closed to cause conduction only on rising edge when a rectified AC voltage is less then an output voltage.

3. The method of claim 2 further comprising:
sensing when an input voltage falls below an output voltage; and
closing the switch only when the input voltage falls below an output voltage.

4. The method of claim 2 further comprising:
sensing when an input voltage is slightly above the output voltage; and
closing the switch after a predetermined delay to allow the input voltage falls below an output voltage.

5. The method of claim 2 further comprising:
sensing a rate of change of an input voltage; and
closing the switch when the rate of change changes from a negative value to a positive value.

6. The method of claim 2 further comprising:
sensing when an input voltage falls below a predetermined value, the predetermined value being a lowest anticipated output voltage; and
closing the switch only when the input voltage falls below the predetermined value.

7. The method of claim 2 further comprising opening the switch when an output voltage reaches a regulation voltage.

8. A circuit for converting high voltage AC to low voltage DC using a switched power supply and rising edge conduction comprising:
a rectifier coupled to an Alternating Current (AC) power source;
a switching device coupled to the rectifier, wherein opening and closing of the switching device is done only during rising edge conduction;
control circuitry coupled to the switching device for suppression of falling edge conduction, the control circuitry opening of the switching device when an output voltage reaches a regulation voltage and will close the switching device when a rectified AC voltage from the AC power source is less than the output voltage; and
a storage capacitive element coupled to the switching device.

9. A circuit for converting high voltage AC to low voltage DC using a switched power supply and rising edge conduction in accordance with claim 8 further comprising a floating gate drive supply referenced to the output voltage and coupled to the rectifier to power the control circuitry.

10. A circuit for converting high voltage AC to low voltage DC using a switched power supply and rising edge conduction in accordance with claim 8 wherein the switching device is an N-channel transistor.

11. A circuit for converting high voltage AC to low voltage DC using a switched power supply and rising edge conduction in accordance with claim 10 wherein the switching device is an N-channel MOSFET.

12. A circuit for converting high voltage AC to low voltage DC using a switched power supply and rising edge conduction in accordance with claim 10 wherein the switching device is an N-channel IGBT.

13. A circuit for converting high voltage AC to low voltage DC using a switched power supply and rising edge conduction in accordance with claim 9 wherein the floating gate drive supply is a zener shunt regulator.

14. A circuit for converting high voltage AC to low voltage DC using a switched power supply and rising edge conduction in accordance with claim 9 wherein the floating gate drive supply comprises:

a zener diode;

a resistor having a first terminal coupled to the rectifier and a second terminal coupled to a first terminal of the zener diode; and a capacitor having a first terminal coupled to a first terminal of the zener diode and a second terminal coupled to a second terminal of the zener diode.

15. A circuit for converting high voltage AC to low voltage DC using a switched power supply and rising edge conduction in accordance with claim 8 wherein the control circuitry comprises:

control logic having a first input coupled to the rectifier and an output coupled to the switching device; and a voltage divider circuit having an output coupled to a second input of the control logic.

16. A circuit for converting high voltage AC to low voltage DC using a switched power supply and rising edge conduction in accordance with claim 15 wherein the control logic comprises:

a first comparator having a first input coupled to the rectifier and a second input coupled to the storage capacitive element;

a second comparator having a first input coupled to the voltage divider circuit and a second input coupled to a voltage source; and a flip flop having a first input coupled to an output of the first comparator, a second input coupled to an output of the second comparator, and an output coupled to the switching device.

17. A circuit for converting high voltage AC to low voltage DC using a switched power supply and rising edge conduction in accordance with claim 15 wherein the voltage divider circuit comprises:

a first resistor;

a second resistor coupled in series with the first resistor; and a comparator having a first input coupled to the first and second resistors, a second input coupled to a regulation voltage, and an output coupled to the control logic.

* * * * *